United States Patent [19]

Nozawa et al.

[11] Patent Number: 4,503,372
[45] Date of Patent: Mar. 5, 1985

[54] METHOD AND APPARATUS FOR SENSING PRESENT POSITION IN POSITION CONTROL SYSTEM

[75] Inventors: Ryoichiro Nozawa, Tokyo; Hidetsugu Komiya; Hajimu Kishi, both of Hino; Hitoshi Matsuura; Etsuo Yamazaki, both of Hachioji; Hiroshi Sakurai, Hino, all of Japan

[73] Assignee: Fanuc Ltd., Minamitsuru, Japan

[21] Appl. No.: 442,422

[22] Filed: Nov. 17, 1982

[30] Foreign Application Priority Data

Nov. 25, 1981 [JP] Japan .............................. 56-188594

[51] Int. Cl.³ .......................................... G05B 19/28
[52] U.S. Cl. .................................. 318/560; 318/602
[58] Field of Search ............... 318/568, 569, 603, 625, 318/578, 602, 632; 364/170

[56] References Cited

U.S. PATENT DOCUMENTS 4,074,177  2/1978  Olig .................................... 318/602

Primary Examiner—William M. Shoop
Assistant Examiner—Saul M. Bergmann
Attorney, Agent, or Firm—Staas & Halsey

[57] ABSTRACT

A method and apparatus for sensing the present position of a movable machine element in a position control system when a position control loop in the system is placed in the open state. In the position control system, error storage means computes and stores an error which corresponds to the difference between a command value produced by a control unit and an amount of movement sensed by a position sensor provided on a motor shaft or on the movable machine element. A speed control circuit controls the motor in accordance with the error from the error storage means. The method of sensing the present position includes the steps of reading and storing the error from the error storage means as a steady deviation immediately before the position control loop is switched from the closed to the open state, reading the error in the error storage means when the position control loop is in the open state, updating the content of a present position register on the basis of an arithmetic difference obtained by subtracting the steady deviation from the error read from the error storage means when the position control loop is in the open state, and revising the content of the error storage means in dependence upon the arithmetic difference.

13 Claims, 3 Drawing Figures and

METHOD AND APPARATUS FOR SENSING PRESENT POSITION IN POSITION CONTROL SYSTEM

BACKGROUND OF THE INVENTION

CROSS-REFERENCE TO U.S. APPLICATIONS

This application is related to U.S. Ser. No. 442,423 filed Nov. 17, 1982 and U.S. Ser. No. 442,424 filed Nov. 17, 1982.

This invention relates to a method and apparatus for sensing the present position of a machine element in a system for controlling the position of the machine element. More particularly, the invention relates to a method and apparatus for sensing the present position for application to a position control system, wherein the present position of the machine element is sensed even after a position control loop is opened by cutting off the machine element from the control system.

In a position control system for positionally controlling a machine element in a machine tool, electric discharge machine or the like, it is necessary to sense the present position of the machine element at all times in order to accurately control the position of the machine element. Such a position control system includes a control unit and a position control loop and is so arranged that the control unit applies move commands having specific magnitudes to the position control loop. Therefore, by monitoring the output of the position control loop, which depends upon the magnitude of the position command, it is possible for the control unit to sense the present position of the machine element. However, in a case where the position control loop is opened by cutting off or isolating the machine element from the position control system and then placing the machine element under the control of another control system, the control unit is no longer capable of sensing the present position. Thus, even when the position control loop is closed again to reconnect the associated position control system, the control unit will not be capable of effecting positional control in an accurate manner.

Accordingly, a method has been proposed wherein the present position of the machine element is sensed on the basis of feedback pulses indicative of the machine element position, even when the position control loop is opened. A problem encountered with this method, however, is that it is difficult to sense the present position accurately because of an offset voltage developed in the associated circuitry.

SUMMARY OF THE INVENTION

Accordingly, an object of the present invention is to provide a method and apparatus for sensing the present position of a machine element in a position control system, wherein the present position of a machine element can be sensed in an accurate manner even when a position control loop is repeatedly opened and closed.

Another object of the present invention is to provide a method and apparatus for sensing the present position of a machine element in a position control system, wherein it is possible to prevent the compounding of errors which arise in sensing the present position owing to an offset voltage developed in the circuitry forming a position control loop.

Still another object of the present invention is to provide a method and apparatus for sensing the present position of a machine element in a position control system, wherein the machine element will not be provided with an erroneous move command when a position control loop is restored from an open state to a closed state.

Other features and advantages of the present invention will be apparent from the following description taken in conjunction with the accompanying drawings, in which like reference characters designate the same or similar parts throughout.

DESCRIPTION OF THE PREFERRED EMBODIMENT

Figure 1:
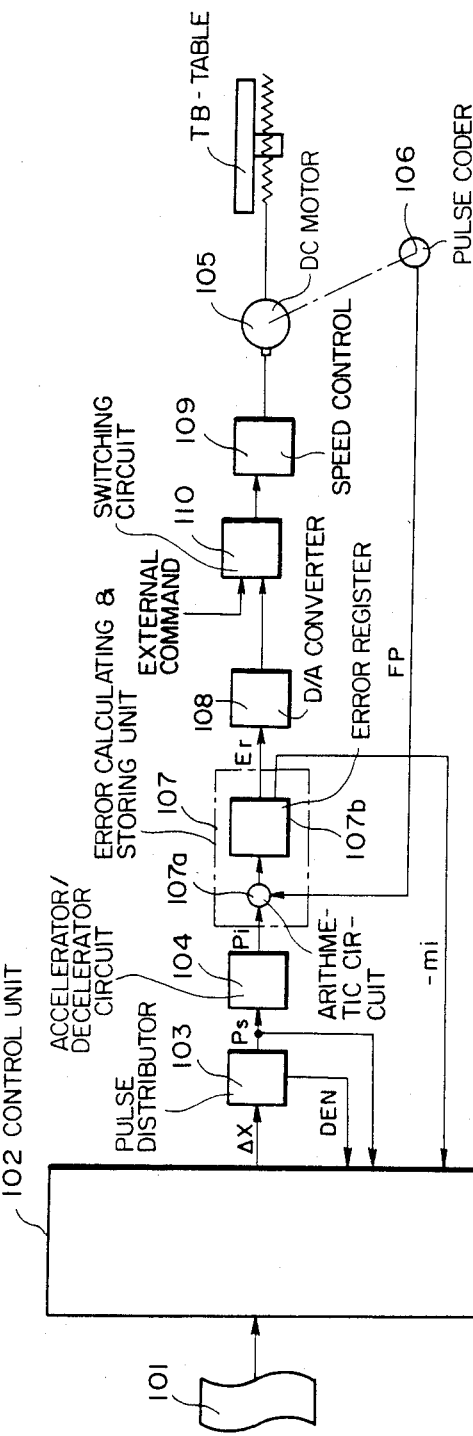
FIG. 1 is a block diagram of a position control system and is useful in describing a method for sensing the present position of a machine element according to the prior art.

Reference will first be made to the block diagram of FIG. 1 showing a position control system for the purpose of describing the conventional method of sensing the present position. Numeral 101 denotes a paper tape in which numerical control (NC) data is punched. Numeral 102 denotes a control unit, constituting a microcomputer, which causes a tape reader (not shown) to read in the NC command data from the paper tape 101, and which decodes the read NC data, delivering, e.g., M, S and T function commands to the machine side through a heavy current switchboard and a move command $Z_c$ to a pulse distributor 103, which is the succeeding stage. The pulse distributor 103 executes well-known pulse distribution computations on the basis of the move command $z_c$, and generates distributed pulses $P_s$ at a frequency corresponding to a commanded speed. Numeral 104 designates a known accelerator/decelerator circuit which generates a train of pulses $P_i$ by rectilinearly accelerating the pulse rate of the train of distributed pulses $P_s$ at the occurrence of this pulse train and by rectilinearly decelerating the same at the end of this pulse train. Numeral 105 indicates a D.C. motor for transporting a table TB. A pulse coder 106 generates one feedback pulse FP each time the DC motor 105 rotates a predetermined amount. An error calculating and storing unit 107 is constructed of, for example, a reversible counter. The unit 107 computes the difference $E_r$ between the number of the input pulses $P_i$ received from the accelerator/decelerator circuit 104 and that of the feedback pulses FP, and is further adapted to store $E_r$. This error calculating and storing unit may be constructed, as shown in the figure, of an arithmetic circuit 107a for calculating the difference $E_r$ between the numbers of the pulses $P_i$ and FP input thereto, and an error register 107b for storing the error $E_r$. More specifically, assuming that the DC motor 105 is rotating in the forward direction because of a command to that effect, the error calculating and storing unit 107 operates in such a manner that each time the input pulse $P_i$ is generated, it is counted up by means of the arithmetic circuit 107a, while each time the feedback pulse FP is generated, the content is counted down, and the difference $E_r$ between the number of input pulses and the feedback pulses is stored in the error register 107b.

Numeral 108 denotes a D/A (digital-to-analog) converter for generating an analog voltage proportional to the content (digital value) of the error register 107b. The analog voltage is applied to a speed control circuit 109 which produces a signal indicative of the difference between the actual speed of the motor 105, sensed by means of a speed sensor which is not shown, and the commanded speed obtained from the D/A converter 108. Numeral 110 designates a switching circuit for switching between the output of the D/A converter 108 and an external command, or for severing the connection between the D/A converter 108 and the speed control circuit 109.

Assume that the D/A converter 108 and speed control circuit 109 are connected together, establishing the "closed" state. When the control unit 102 issues a move command (an incremental value) $\Delta X$, the pulse distributor 103 executes the pulse distribution computation on the basis of $\Delta X$ and produces the distributed pulses $P_s$, the number of pulses $P_s$ corresponding to $\Delta X$. Upon receiving the pulses $P_s$, the accelerator/decelerator circuit 104 accelerates and decelerates the pulse rate thereof and applies the train of command pulses $P_i$ to the error calculating and storing circuit 107. Thus, the content of the error register 107b becomes non-zero, so that the D/A converter 108 provides a voltage and the motor 105 is driven by the speed control circuit 109 so as to move the table TB. When the motor 105 has rotated by a predetermined amount, the feedback pulse FP is generated by the pulse coder 106 and is applied to the error calculating and storing unit 107, with the error register 107b storing the difference $E_r$ between the number of command pulses $P_i$ and the number of feedback pulses FP. Thenceforth, the table TB is servo-controlled in such a manner that the difference Er approaches zero, with the table being transported to the target position. In the closed state described above, the control unit 102 senses and stores the present position of the table TB through the distributed pulses from the pulse distributor 103.

There are cases where the table TB, after arriving at the target position, has its movement controlled by an apparatus other than the control unit 102. When such is the case, the switching circuit 110 disconnects the speed control circuit 109 from the D/A converter 108 to establish the "open" state and connects an external command, such as the output of a profiling apparatus, to the speed control circuit 109. As the motor 105 is rotated in accordance with the output of the profiling apparatus, the pulse coder 106 generates the feedback pulses FP which enter the error calculating and storing circuit 107 to gradually increment the content of the error register 107b. As this process continues, the error register 107b will eventually overflow. In order to prevent such overflow from occurring, and in order to store the table position internally in the control unit 102, a method of sensing the present position based on a so-called follow-up technique is available. A discussion of this method follows.

As the motor 105 rotates in accordance with the profiling apparatus output, namely the external command, to transport the table TB, pulse coder 106 generates a single feedback pulse FP each time the motor rotates by a predetermined amount. The content of error register 107b is updated, i.e., decremented by one step, each time a feedback pulse FP is produced. If we assume that the content of the error register 107b initially is zero, then its content will be decremented to $-m_1$ by the generation of $m_1$-number of feedback pulses. The $-m_1$ data is read by the control unit 102 which performs the operation:

$$M + m_1 \rightarrow M \tag{1}$$

with respect to the content M of a present position register located within the control unit 102. In (1), the initial value of M is $M_o$. The control unit 102 also changes the sign of this data from $-$ to $+$, applying $+m_1$ to the pulse distributor 103. The pulse distributor 103 responds to the $+m_1$ data by immediately performing a pulse distribution operation to produce the distributed pulses $P_s$. The distributed pulses $P_s$ enter the accelerator/decelerator circuit 104 which responds by producing the command pulses Pi. These pulses are applied to the error computing and storing unit 107, the content of the error register 107b being updated by one step in the positive direction each time a pulse $P_i$ arrives. The error computing and storing unit 107 concurrently receives the feedback pulses FP at its other input as long as the motor 105 is rotating. These pulses update the error register 107b by one step in the negative direction each time one of them arrives. Accordingly, if we assume that the time at which the content $-m_1$ is read out of the error register 107b is $t_1$, that the time at which the $m_1$-number of distributed pulses $P_s$ is generated is $t_2$, and that $m_2$-number of feedback pulses FP are generated between times $t_1$ and $t_2$, then the content of error register 107b at time $t_2$ will be $-m_2$.

The pulse distributor 103, upon producing the number of distributed pulses $P_s$ commensurate with the magnitude of the command, issues a signal DEN indicative of the end of the pulse distribution operation. The control unit 102 responds to the signal DEN by once again reading the content ($-m_2$) of the error register 107b and performing the following addition:

$$M + m_2 \rightarrow M \tag{1'}$$

with respect to the content M of the present position register. The control unit 102 also applies the data $+m_2$ (whose sign has been changed) to the pulse distributor 103. Owing to the operation (1') above, the content M of the present position register is $M_o + m_1 + m_2$. Thenceforth, each time the pulse distribution end signal DEN is generated, the control unit 102 reads the content $-m_i$ ($i = 1,2,3...$) of the error register 107b and performs the addition:

$$M + m_i \rightarrow M \ (= M_o + \Sigma m_i) \tag{1''}$$

with respect to the content M of the present position register, and applies the numerical value $+m_i$ to the pulse distributor 103. From then on the aforesaid operations are repeated.

The foregoing is summarized by the following table:

| Time | t1 | t2 | t3 | – | ti | – | tj | tj + 1 |
|---|---|---|---|---|---|---|---|---|
| Number of pulses FP generated | $m_1$ | $m_2$ | $m_3$ | ... | $m_i$ | ... | $m_j$ | 0 |
| Number of pulses Ps generated | 0 | $m_1$ | $m_2$ | ... | $m_{i-1}$ | ... | $m_{j-1}$ | $m_j$ |
| Content of error | $-m_1$ | $-m_2$ | $-m_3$ | ... | $-m_i$ | ... | $-m_j$ | 0 |

| Time     | t1 | t2 | t3 | – | ti | – | tj | tj + 1 |
|----------|----|----|----|---|----|----|----|--------|
| register |    |    |    |   |    |   |    |        |

In the table shown above, t1 is the time at which the content of error register 107b is initially read, ti (i=2,3...) is the time at which the pulse distribution end signal DEN is generated, and $m_i$ represents the number of feedback pulses produced between time ti−1 and time ti. It will be appreciated from the table that the total number M of feedback pulses FP produced up to time tj+1 may be expressed by the following:

$$M = \sum_{i=1}^{j+1} m_i$$

which is precisely in agreement with the sum total exhibited by the error register 107b. The follow-up technique is performed by reading the content of the error register 107b to update the present position recorded in the present position register, and by reversing the polarity of the read data before applying it to the error register 107b from the command side. Accordingly, if we let the content of the error register 107b be A, then the operation actually performed is A+(−A)→0 so that, ultimately, the content of error register 107b is held at a numerical value of zero.

It should be noted that in a case where the D/A converter 108 and speed control circuit 109 are connected to each other, the content of the error register 107b generally is not zero but indicates a predetermined deviation −B when the motor 105 is at rest. This is attributed to the offset voltage of a motor drive amplifier or the like in the D/A converter 108 or speed control circuit 109.

If the D/A converter 108 and speed control circuit 109 are disconnected from each other when the motor 105 is at rest and, hence, when the deviation −B based on the offset voltage prevails, then the present position data stored within the control unit 102 is increased by B in accordance with the follow-up technique so that the data is brought into coincidence with the actually prevailing present position of the table. The content of error register 107b becomes zero. Then, when the D/A converter 108 and speed control circuit 109 are reconnected after the operation initiated by the external command (as from the profiling apparatus), the motor 105 is caused to rotate until the deviation −B is stored in the error register 107b. In other words, movement of the machine element, namely the table TB, accompanies the action of restoring the position control loop to the closed state when the external command mode of operation ends.

Figure 2:
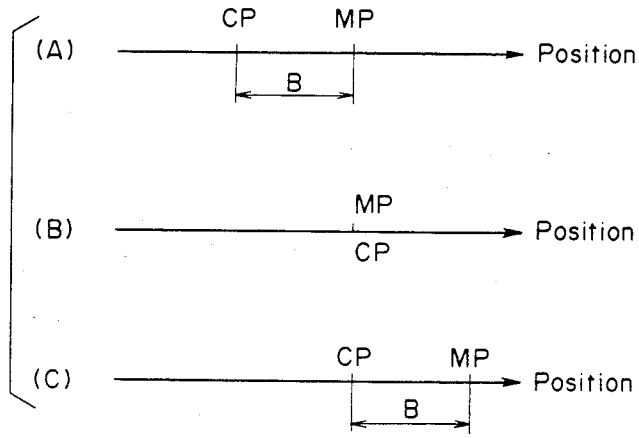
FIG. 2 is a diagram for describing a problem encountered in the method of sensing the present position according to the prior art.

Such movement of the machine element when the closed state is established may be understood from FIG. 2. Specifically, (A) in FIG. 2 illustrates the situation for the closed state, showing that there is a difference, equivalent to the steady deviation B, between the present position CP of the machine element as stored within the control unit, and the actually prevailing or true present position MP. FIG. 2 (B) illustrates the case where the status of the position control loop is changed from closed to open, indicating coincidence between the internally stored present position CP of the machine element and the actually prevailing present position MP of the machine element, the coincidence is achieved by the follow-up method. FIG. 2 (C) illustrates the case where the closed state is restored, and shows that the machine element will move until the steady deviation −B is stored in the error register 107b. More specifically, in the method of sensing the present position by means of the conventional follow-up technique, the machine element is shifted each time the status of the position control loop is changed from the open state to the closed state in the presense of the steady deviation −B which is based on the offset voltage. Thus, each transition from the open state to the closed state gives rise to an error, with each error being added to that which preceded it. Another consequence is a change in the internally stored present position, causing a shift in the indicated present position.

In view of the foregoing phenomenon, the method of sensing present position according to this invention is so designed that there is no machine element movement and no change in the position indicated by the present position register in a case where the status of the position control loop is changed from the open state to the closed state. Reference will now be had to the drawings to describe the method of the invention in detail.

When the status of the position control loop is changed from closed to open in the present position sensing method using the conventional follow-up technique, the internally stored present position of the machine element is updated by reading the content (steady deviation) B of error register 107b, whereby said internally stored present position is made to coincide with the actually prevailing present position of the machine element and the content of error register 107b is made zero. When the position control loop is restored from the open state to the closed state, such processing causes the machine element to move.

Accordingly, the object of the present invention is to read out and store the steady deviation, recorded in the error register 107b, immediately before switching over to the external command mode of operation (i.e., before switching over from the closed state to the open state), and then to exercise follow-up control, in the manner described hereinafter, during the external command mode of operation, that is, while the position control loop is open. Specifically, the content of the internal present position register is updated on the basis of a value [A−(−B)], obtained by subtracting the above-mentioned stored steady deviation −B from the content A registered in the error register 107b. Then, by issuing a command (−B−A), namely [A−(−B)] with the polarity reversed, the content of the error register 107b is diminished by [A−(−B)]. When the machine element is stopped, therefore, the content of error register 107b will always have the value −B.

With this method, the content of the present position register will develop an error equivalent to the steady deviation with regard to the actual position of the machine element, as illustrated in FIG. 2(A). However, the error will always be equivalent to the steady deviation regardless of how many times the position control loop is changed from the closed to the open state and from the open to the closed state. This makes it possible to prevent the situation where the present position can no longer be sensed because of errors compounded by the repeated change in the state of the position control loop. In other words, according to the present invention, the control unit is always capable of sensing the actually prevailing or true present position of the machine element by combining the content of the present position register and the steady deviation.

Figure 3:
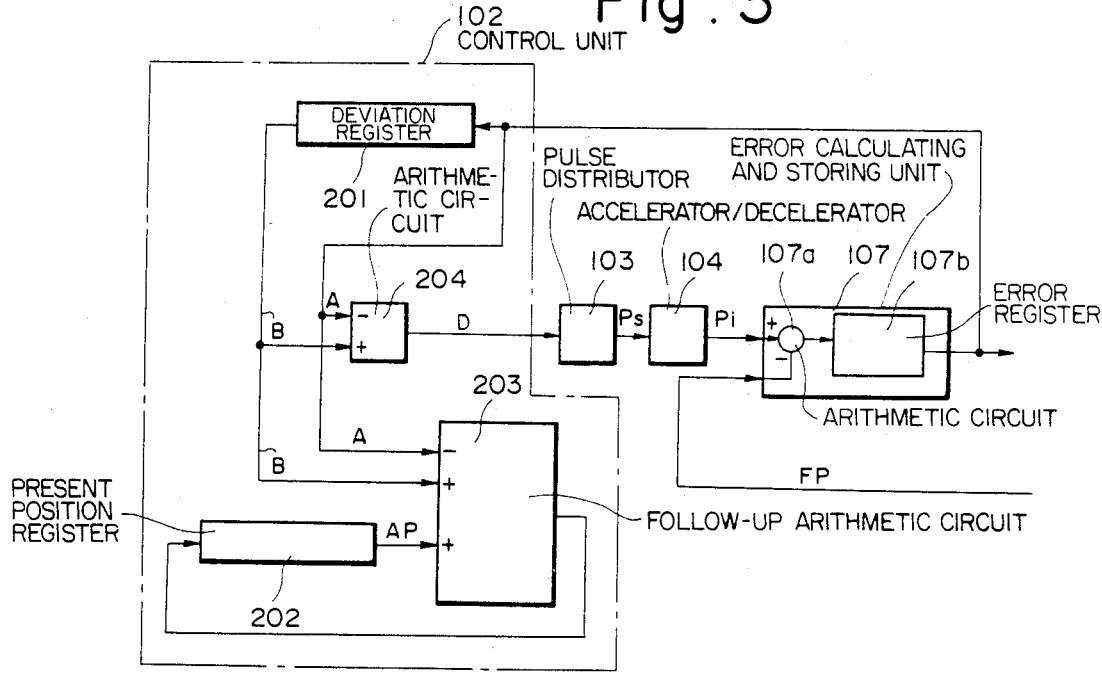
FIG. 3 is a block diagram of an embodiment of an apparatus for practicing a method for sensing the present position according to the present invention.

FIG. 3 is a block diagram of follow-up circuitry provided in the control unit 102 of FIG. 1. The control unit 102 includes a deviation register 201. When the operating mode is switched over to the external command mode of operation (i.e., when the status of the position control loop is changed from the closed to open state), the deviation register 201 functions to store the steady deviation $-B$, registered in the error register 107$b$, prior to the initiation of follow-up. Also provided is a present position register 202 for storing the present position AP of the machine element. When the position control loop is in the closed state, the content of the present position register 202 is counted up by an arithmetic circuit (not shown) on the basis of distributed pulses generated by the pulse distributor 103, whereby the register 202 stores the present position of the machine element. The output AP of the present position register 202 is applied to a follow-up arithmetic circuit 203, whose other inputs are the data A from the error register 107$b$ and the data $-B$ from the register 201. On the basis of these inputs, the follow-up arithmetic circuit 203 performs the operation:

$$AP - [A - (-B)] \rightarrow AP \qquad (1)$$

thereby updating the content of the present position register 202. The control unit 102 further includes an arithmetic circuit 204 for performing the operation:

$$-[A - (-B)] = D \qquad (2)$$

and for applying the result D to the pulse distributor 103.

In operation, the content of the error register 107$b$, namely the steady deviation $-B$, is preset in the register 201 when the mode of operation is switched over to the external command mode. Next, the follow-up arithmetic circuit 203 performs the operation given by expression (1) above, and the arithmetic circuit 204 performs the operation given by expression (2). Since $A = -B$ ($D=0$) in a case where the machine element has not yet been moved by the external command, no updating of the present position AP takes place and the pulse generator 103 does not generate the distributed pulses $P_s$, so that the content of the error register 107$b$ is equivalent to $-B$. On the other hand, when the machine element is moved in the forward direction by the external command and $m_1$—number of feedback pulses FP are generated, the content A of the error register 107$b$ becomes $-(B+m_1)$. As a result, the content of the present position register 202 is updated to $(AP+m_1)$ in accordance with the foregoing arithmetic operations (1) and (2), and the pulse distributor 103 is issued a command equivalent to $-[A-(-B)]=m_1$. When this occurs, the pulse distributor 103 immediately begins the pulse distribution operation for the production of the distributed pulses $P_s$. These pulses are applied to the error computing and storing unit 107 via the accelerator/decelerator circuit 104, whereby the content of the error register 107$b$ is incremented by one step in the positive (forward) direction each time a distributed pulse $P_s$ is generated. At the instant $m_1$—number of distributed pulses $P_s$ are generated, the pulse distribution end signal is produced and the pulse distribution operation ends, at which time the content of error register 107$b$ is $-B$.

In a case where the machine element continues to be moved by the external command, the feedback pulses FP are applied to the error register 107$b$ while the pulse distribution operation based on $m_1$ is being executed. The feedback pulses update the register 107$b$ in the negative (reverse) direction as each one is generated. Accordingly, if we assume that the time at which the content $-(B+m_1)$ is read out of the error register 107$b$ is $t_1$, that the time at which the $m_1$—number of distributed pulses are generated is $t_2$, and that $m_2$—number of feedback pulses FP are generated between times $t_1$ and $t_2$, then the content of error register 107$b$ at time $t_2$ will be $-(B+m_2)$. Now, when the arithmetic operations (1) and (2) are performed when the pulse distribution end signal is generated, the content of the present position register 202 is updated to $(AP+m_1+m_2)$, and a command equivalent to $m_2$ is applied to the pulse distributor 103. Thereafter, by exercising control in a similar manner, the content of the present position register 202 will be updated correctly to $AP+\Sigma m_i$, and the content of the error register 107$b$ will be $-B$, when the machine element comes to rest upon completion of the control operation based on the external command. Therefore, when the position control loop is later switched from the open to the closed state, the steady deviation $-B$ will already be stored in the error register 107$b$, so that the change in the status of the loop will not be accompanied by movement of the machine element.

In accordance with the present invention as described and illustrated hereinabove, follow-up is executed in such a manner that the steady deviation is left stored in the error register at all times. When the position control loop is switched over from the open to the closed state, therefore, the machine element will not move, errors will not be compounded and the positional indication will not change.

As many apparently widely different embodiments of the present invention can be made without departing from the spirit and scope thereof, it is to be understood that the invention is not limited to the specific embodiments thereof except as defined in the appended claims.

What we claim is:

1. A method for sensing the present position of a machine element in a position control system, operatively connectable to receive a feedback quantity and a steady deviation, when a connection between an error storage means and a speed control circuit is severed to place a position control loop in an open state, the position control system including error storage means for storing an error between a commanded magnitude produced by a control unit, for storing the feedback quantity and for storing the steady deviation, a speed control circuit connected to the error storage means for controlling a motor in accordance with the error, and having a position sensor mounted on the motor shaft or on a movable machine element driven by the motor, the position control system further including a present position register for storing a present position of the machine element, and a position control loop wherein an amount of movement sensed by the position sensor is applied to the error storage means as the feedback quantity, said method comprising the steps of:

(a) reading and storing the error from the error storage means as a steady deviation immediately before the position control loop, connecting the error storage means and the speed control circuit, is switched from the closed state to the open state;

(b) reading the error in the error storage means when the position control loop is in the open state;

(c) updating the content of the present position register by storing the present position of the machine element determined on the basis of an arithmetic difference obtained by subtracting the steady deviation from the error read from the error storage means; and (d) revising the content of the error storage means in dependence upon the arithmetic difference.

2. A method according to claim 1, in which said step (d) comprises the substep of subtracting the arithmetic difference from the content of the present position register.

3. A method according to claim 1, in which said step (d) comprises the substep of subtracting the arithmetic difference from the content of the error storage means.

4. A method according to claim 1, in which said step (d) comprises the substeps of:

(i) generating a signal indicative of a value equivalent to the arithmetic difference with the sign thereof reversed; and (ii) adding the value of the signal to the content of the error storage means.

5. A method according to claim 4, in which said substep (i) comprises the substep of generating a plurality of pulses corresponding to the value of the signal generated in said substep (i), and in which said substep (ii) comprises the substep of counting up the content of the error storage means in dependence upon the generated pulses.

6. A method according to claim 5, further comprising a step of executing said steps (b), (c) and (d) successively in response to the pulses generated.

7. A position control system having a control unit for producing a command signal, error storage means for storing an error corresponding to the difference between the magnitude of the command signal and a feedback quantity, a speed control circuit operatively connected to the error storage means for controlling a motor in accordance with the error, and a position sensor provided on the motor shaft or on a movable machine element driven by the motor, the position control system including a position control loop wherein an amount of movement sensed by the position sensor is applied to the error storage means as the feedback quantity, and an apparatus for sensing the present position of the machine element when the connection between the error storage means and speed control circuit is disconnected to place the position control loop in the open state, said control unit comprising:

a steady deviation register, operatively connected to the error storage means, for storing an error from the error storage means as a steady deviation immediately before the position control loop, connecting the error storage means and the speed control circuit, is switched from the closed state to the open state;

a present position register, operatively connected to the apparatus for sensing the present position of the machine element, for storing the present position of the machine element; and updating control means, operatively connected to said present position register, for updating the content of said present position register on the basis of an arithmetic difference obtained by subtracting the steady deviation in said steady deviation register from the error in the error storage means read when the position control loop is in the open state, and for delivering the arithmetic difference to the error storage means to revise the content thereof in dependence upon the arithmetic difference.

8. An apparatus according to claim 7, wherein said updating control means comprises:

a first arithmetic circuit, operatively connected to said steady deviation register and operatively connected to receive the error in the error storage means as an input, for producing a signal indicative of the arithmetic difference; and a second arithmetic circuit, operatively connected to said steady deviation register and to said present position register and operatively connected to receive the error in the error storage means, for updating the content of said present position register.

9. A method for sensing the present position of a machine element in a position control system, including a motor, error storage means for storing an error and a steady deviation signal, a speed control circuit operatively connected to the error storage means and the motor for controlling the motor in accordance with the error, and a position control loop having an open state or a closed state, said method comprising the steps of:

(a) reading and storing the error from the error storage means as a steady deviation immediately before the position control loop connecting the error storage means and the speed control circuit is switched from the closed state to the open state;

(b) reading the error in the error storage means when the position control is in the open state;

(c) updating the contents of the present position register by storing the present position of the machine elements determined on the basis of an arithmetic difference obtained by subtracting the steady deviation from the error read from the error storage means; and (d) revising the contents of the error storage means in dependence upon the arithmetic difference.

10. A position control system including a movable machine element, a motor connected to the movable machine element, an error storage means for storing an error, a speed control circuit operatively connected to the error storage means and the motor for controlling the motor in accordance with the error, and a position control loop connecting the error storage means and the speed control circuit, for applying an amount of movement of the machine element to the error storage means and having an open state or a closed state, and a control unit for producing a command signal, said control unit comprising:

a steady deviation register, operatively connected to the error storage means, for storing an error from the error storage means as a steady deviation immediately before the position control loop is switched from the closed state to the open state;

a present position register, operatively connected to the machine element, for storing the present position of the machine element; and updating control means, operatively connected to the present position register, for updating the contents of said present position register on the basis of an arithmetic difference obtained by subtracting the steady deviation in said steady deviation register from the error in the error storage means read when the position control loop is in the open state, and for delivering the arithmetic difference to the error storage means to revise the contents thereof in dependence upon the arithmetic difference.

11. An apparatus according to claim 10, wherein said updating control means comprises:
- a first arithmetic circuit, operatively connected to said steady deviation register and operatively connected to receive the error in the error storage means as an input, for producing a signal indicative of the arithmetic difference; and
- a second arithmetic circuit, operatively connected to said steady deviation register and to said present position register and operatively connected to receive the error in the error storage means, for updating the content of said present position register.

12. A position control system having a control unit for producing a command signal, error storage means for storing an error corresponding to the difference between the magnitude of the command signal and a feedback quantity, a speed control circuit operatively connected to the error storage means for controlling a motor in accordance with the error, and a position sensor provided on the motor shaft or on a movable machine element driven by the motor, the position control system including a position control loop wherein an amount of movement sensed by the position sensor is applied to the error storage means as the feedback quantity, and an apparatus for sensing the present position of the machine element when the connection between the error storage means and speed control circuit is disconnected to place the position control loop in the open state, said control loop comprising:
- a steady deviation register, operatively connected to the error storage means, for storing an error from the error storage means as a steady deviation immediately before the position control loop, connecting the error storage means and the speed control circuit, is switched from the closed state to the open state;
- a present position register, operatively connected to the apparatus for sensing the present position of the machine element, for storing the present position of the machine element; and
- updating control means, operatively connected to said present position register, for updating the contents of said present position register on the basis of an arithmetic difference obtained by subtracting the steady deviation in said steady deviation register from the error in the error storage means read when the position control loop is in the open state, and for delivering the arithmetic difference to the error storage means to revise the contents thereof in dependence upon the arithmetic difference, said updating control means comprising:
  - a first arithmetic circuit, operatively connected to said steady deviation register and operatively connected to receive the error in the error storage means as an input, for producing a signal indicative of the arithmetic difference; and
  - a second arithmetic circuit, operatively connected to said steady deviation register and to said present position register and operatively connected to receive the error in the error storage means, for updating the contents of said present position register.

13. A position control system including a movable machine element, a motor connected to the movable machine element, an error storage means for storing an error, a speed control circuit operatively connected to the error storage means and the motor for controlling the motor in accordance with the error, and a position control loop connecting the error storage means and the speed control circuit, for applying an amount of movement of the machine element to the error storage means and having an open state or a closed state, and a control unit for producing a command signal, said control unit comprising:
- a steady deviation register, operatively connected to the error storage means, for storing an error from the error storage means as a steady deviation immediately before the position control loop is switched from the closed state to the open state;
- a present position register, operatively connected to the machine element, for storing the present position of the machine element; and
- updating control means, operatively connected to the present position register, for updating the contents of said present position register on the basis of an arithmetic difference obtained by subtracting the steady deviation in said steady deviation register from the error in the error storage means read when the position control loop is in the open state, and for delivering the arithmetic difference to the error storage means to revise the contents thereof in dependence upon the arithmetic difference, said updating control means comprising:
  - a first arithmetic circuit, operatively connected to said steady deviation register and operatively connected to receive the error in the error storage means as an input, for producing a signal indicative of the arithmetic difference; and
  - a second arithmetic circuit, operatively connected to said steady deviation register and to said present position register and operatively connected to receive the error in the error storage means, for updating the contents of said present position register.

* * * * *

UNITED STATES PATENT AND TRADEMARK OFFICE
CERTIFICATE OF CORRECTION

PATENT NO. : 4,503,372

DATED : MARCH 5, 1985

INVENTOR(S) : NOZAWA ET AL.

It is certified that error appears in the above-identified patent and that said Letters Patent is hereby corrected as shown below:

Col. 2, line 39, "$z_c$" should be --$Z_c$--.

Col. 3, line 20, "$P_S$ corresponding" should be --$P_S$ corresponding--.

Col. 6, line 25, "closed to open" should be --the closed state to the open state--.

Signed and Sealed this

Twenty-seventh Day of August 1985

[SEAL]

Attest:

DONALD J. QUIGG

Attesting Officer   Acting Commissioner of Patents and Trademarks